April 16, 1929.  W. G. YARDLEY  1,709,423
HEAD LAMPS OF MOTOR VEHICLES
Filed April 20, 1927
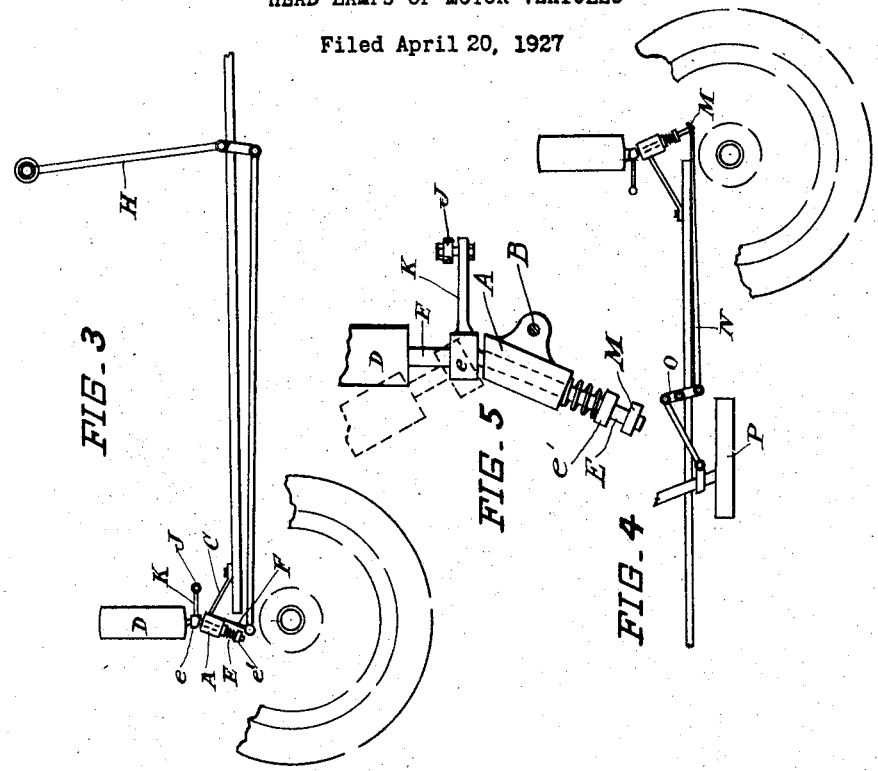
Inventor:
Walter George Yardley
By
Attorney Patented Apr. 16, 1929.

1,709,423

UNITED STATES PATENT OFFICE.

WALTER GEORGE YARDLEY, OF PALMERSTON NORTH, NEW ZEALAND.

HEAD LAMPS OF MOTOR VEHICLES.

Application filed April 20, 1927, Serial No. 185,279, and in New Zealand October 18, 1926.

This invention relates to means for use in mounting the head lamps of motor vehicles and in the operation thereof so that a number of effects may be obtained that will facilitate the driving of the vehicle by night and will also remove the possibility of the drivers of approaching vehicles being dazzled by the beams from the head lamps of the vehicle upon which the invention is installed.

The said means provide first for the automatic control of the head lamps in correspondence with the steering of the vehicle so that the lamps swivel and throw their beams forward in the direction in which the vehicle is to be turned, in a manner that is already well known; but in this invention a combined action is obtained under which the lamps are also tipped so as to throw their beams downward to immediately in front of the vehicle's course. This ensures that the driver, when turning a corner, will be given a full view of his course and also of the roadway immediately in front of his front wheels so that his turning is facilitated.

The means devised provide, in the second place, for the lamps being operated manually to be tipped, and at the same time to have a swivelling movement imparted to them to direct their beams downward and to the left hand, when the vehicle is running on the straight, so that the lamp beams are diverted from their direct bearing on on-coming vehicles and at the same time illumine the vehicle's own course with the full strength of the lamps.

These automatic effects are obtained by the mounting of each lamp upon a vertical spindle that is bent slightly at its upper end, and the lower end of which is mounted to rotate in a bracket so that on rotation of the spindle, in addition to the turning of the lamp in a vertical plane, the lamp will be tipped by reason of the bend in the spindle. The simultaneous turning of the two lamp spindles is designed to be obtained through special connections with each other and with the steering mechanism of the car so that the combined action mentioned is produced through the operation of such steering mechanism.

The mechanically obtained effects are produced by arranging the two brackets upon the opposite ends of a rod extending transversely across the front of the vehicle and carried in journals so that the rod may be rocked to tip the brackets and lamps carried thereby, and which rocking motion is obtained by connection with a hand lever positioned conveniently to the driver's seat. The movement of the brackets, while the swivelling connection with the steering mechanism is maintained stationary, will cause the simultaneous swivelling movement of the lamp spindles.

These means are illustrated in the accompanying drawings, which are to a great extent diagrammatic, as the details of the operating mechanism may be varied in a number of ways and will be so varied in the application of the invention to different classes of vehicles.

In the drawings:—

Figure 1 is a front elevation of a motor car fitted with lamps mounted and actuated in the manner referred to.

Figure 2 is a plan of the mounting and operating means.

Figure 3 is a view in side elevation of the means for manually tipping the lamps.

Figure 4 is a similar view of the means for automatically swivelling the lamps.

Figure 5 is a side elevation, on an enlarged scale, of one of the lamp carrying brackets and its adjacent parts.

In carrying out the invention, a bracket A is provided for each lamp, such bracket consisting of a metal block of approved length having a bore made to extend axially through it. The two brackets are connected together by means of a bar B, and such bar is carried in journals C fixed to convenient parts of the vehicle body so that the bar extends transversely across the front of the vehicle and is capable of turning in its bearings.

Each lamp D is fixed upon the upper end of a spindle E, which spindle is mounted to extend through the bore of the bracket A so that it may turn therein, the spindle being supported by means of a collar $e$ on its upper end that rests on the bracket top, and being secured by a spring cushion and nut $e'$ at its lower end that keeps it from independent movement in the bracket.

The spindle has its upper end bent at an angle to the portion within the bracket and the lamp is fixed in the same plane as this upper portion. Consequently when the spindle is turned in the bracket the lamp's angle to the vertical will vary from a position in which it is truly vertical to one in which it inclines downwardly and forwardly to a maximum degree as represented by the angle at which the spindle end is bent.

The two brackets are adapted to be disposed so that they extend normally upon the vehicle with a slope rearwards and upwards from their lower ends and at an angle such that the upper portions of the spindles E then extend vertically to hold the lamps in the vertical positions with their beams thrown straight forward. The rotating of the spindle therefore in either direction will result in the lamps being tipped downwardly and forwardly because of the set or angle of the upper part in relation to the lower. The rocking of the bracket carrying bar B in its journals will also act to tip the lamps downwards and upwards as desired.

To provide for these latter movements of the brackets, an arm F is fixed to one of the brackets to extend downward therefrom, and such arm is connected to the forward end of a connecting rod G that is carried rearward beneath one side of the vehicle body (as in Figure 3) and then has its rear end attached to the lower end of a hand lever H. Such hand lever is articulated in the vehicle frame and extends upward from the floor of the body in a position convenient to the driver so that he may rock the lever and thereby move the connecting rod G longitudinally to turn the brackets up or down. Any approved and known means may be provided to hold the lever at the position to which it may be moved.

To provide for the automatic turning of the lamp spindles in their brackets, the two spindles are connected together by a transverse connecting rod J that has its ends attached to crank arms K affixed to extend horizontally from the upper ends of the respective spindles. One of the spindles has a crank arm M fixed on its lower end and extending laterally with relation to the vehicle, and this crank rod is connected by a pivot joint to the forward end of a rod N which has its rear end connected to a rocking lever O (Figure 4) mounted on the underframe of the vehicle. This rocking lever is linked to the steering lever arm P of the vehicle's steering mechanism so that in the longitudinal movements of such arm in its two directions, a push or pull will be exerted on the rod N to cause the spindle to which it is connected to turn and at the same time, through the cranks K and connecting rod J, to turn the other spindle correspondingly and in accordance with the direction in which the steering gear is moved.

As before explained, this turning of the spindles in their bearing brackets (which are held firm) will result in the lamps being tipped downward if the parts are properly positioned with respect to the normal positions.

It will be apparent also that when the brackets are tipped manually through the operation of the hand lever H, there is a movement of the bottom end of the spindle, to which the crank arm M is attached, with respect to the rod N to which such crank is also attached. As this rod is stationary it follows that a turning movement is imparted to the crank and through it to the spindles so that the lamps are deflected to one side when they are tipped. Such deflection is arranged to take place towards the off side of the vehicle. As the lamps are tipped up again, their side deflection is removed by the same means.

Thus the combined deflection and tipping of the lamps is obtained automatically through the operation of the steering mechanism of the vehicle, and the combined tipping and deflection obtained manually by the operation of the hand lever H.

I claim:—

1. In a dirigible headlight system for motor vehicles, a pair of tubular brackets disposed in rearwardly- and upwardly-inclined position; a horizontal carrier bar to which the brackets are secured; bearing means wherein said bar is rotatably supported; a lamp spindle for each bracket embodying a rearwardly- and upwardly-inclined lower portion rotatably mounted in the bracket and a normally-vertical upper portion; a lamp secured to the latter portion of each spindle; a device connected to one spindle and adapted to be operated automatically by the steering mechanism of the vehicle for rotating that spindle and thereby producing a combined lateral rotary movement and downward and forward tipping movement of the associated lamp; and a connection between the two spindles for transmitting such combined movement to the other spindle and lamp.

2. In a dirigible headlight system for motor vehicles, a pair of tubular brackets disposed in rearwardly- and upwardly-inclined position; a horizontal carrier bar to which the brackets are secured; bearing means wherein said bar is rotatably supported; a lamp spindle for each bracket embodying a rearwardly- and upwardly-inclined lower portion rotatably mounted in the bracket and a normally-vertical upper portion; a lamp secured to the latter portion of each spindle; a device connected to one spindle and adapted to be operated automatically by the steering mechanism of the vehicle for rotating that spindle and thereby producing a combined lateral rotary movement and downward and forward tipping movement of the associated lamp; a connection between the two spindles for transmitting such combined movement to the other spindle and lamp; and means independent of the spindle-rotating device for positively rocking the carrier bar about its axis at will so as to tip both brackets and their associated lamps alternatively downward or upward.

3. In a dirigible headlight system for motor vehicles, a pair of tubular brackets disposed in rearwardly- and upwardly-inclined position; a horizontal carrier bar to which the brackets are secured; bearing means wherein said bar is rotatably supported; a lamp spindle for each bracket embodying a rearwardly- and upwardly-inclined lower portion rotatably mounted in the bracket and a normally-vertical upper portion; a lamp secured to the latter portion of each spindle; a crank secured to the lower portion of one spindle; a rod connected at one end to said crank and adapted to be connected at its other end to the steering mechanism of the vehicle to be shifted automatically by the same and to rotate the crank-carrying spindle so as to produce a combined lateral rotary movement and downward and forward tipping movement of the associated lamp; a collar secured to the vertical upper portion of each spindle and provided with a crank arm; and a connecting rod between said crank arms for transmitting the rotary movement of the crank-carrying spindle to the other spindle.

4. In a dirigible headlight system for motor vehicles, a pair of tubular brackets disposed in rearwardly- and upwardly-inclined position; a horizontal carrier bar to which the brackets are secured; bearing means wherein said bar is rotatably supported; a lamp spindle for each bracket embodying a rearwardly- and upwardly-inclined lower portion rotatably mounted in the bracket and a normally-vertical upper portion; a lamp secured to the latter portion of each spindle; a crank secured to the lower portion of one spindle; a rod connected at one end to said crank and adapted to be connected at its other end to the steering mechanism of the vehicle to be shifted automatically by the same and to rotate the crank-carrying spindle so as to produce a combined lateral rotary movement and downward and forward tipping movement of the associated lamp; a collar secured to the vertical upper portion of each spindle and provided with a crank arm; a connecting rod between said crank arms for transmitting the rotary movement of the crank-carrying spindle to the other spindle; and means independent of the spindle-rotating rod for positively rocking the carrier bar about its axis at will so as to tip both brackets and their associated lamps alternatively downward or upward.

In testimony whereof, I affix my signature.

WALTER GEORGE YARDLEY.